W. H. COLDWELL.
CLUTCH MECHANISM.
APPLICATION FILED AUG. 19, 1910  RENEWED JAN. 15, 1912.

1,018,098.

Patented Feb. 20, 1912.
2 SHEETS—SHEET 1.

WITNESSES:

INVENTOR
William H. Coldwell
BY
Attorneys

W. H. COLDWELL.
CLUTCH MECHANISM.
APPLICATION FILED AUG. 19, 1910. RENEWED JAN. 15, 1912.
1,018,098.
Patented Feb. 20, 1912.
2 SHEETS—SHEET 2.
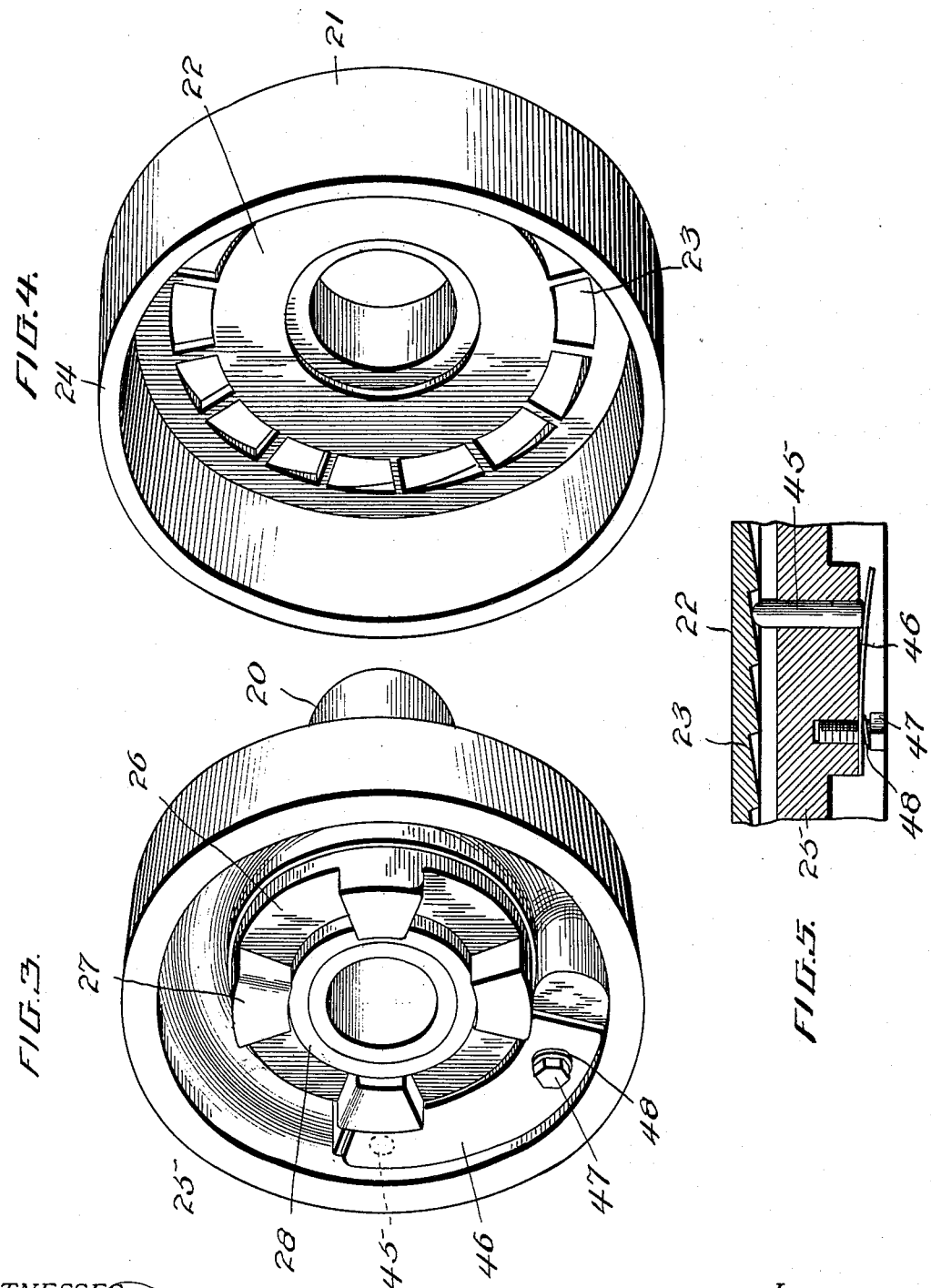

UNITED STATES PATENT OFFICE.

WILLIAM H. COLDWELL, OF NEWBURGH, NEW YORK.

CLUTCH MECHANISM.

1,018,098. Specification of Letters Patent. Patented Feb. 20, 1912.

Original application filed June 21, 1910, Serial No. 568,195. Divided and this application filed August 19, 1910, Serial No. 577,958. Renewed January 15, 1912. Serial No. 671,367.

*To all whom it may concern:*

Be it known that I, WILLIAM H. COLDWELL, citizen of the United States, residing at Newburgh, in the county of Orange and State of New York, have invented certain new and useful Improvements in Clutch Mechanism; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of the invention which I have selected for the purpose of illustration, and said invention is fully disclosed in the following description and claims.

Figure 1:
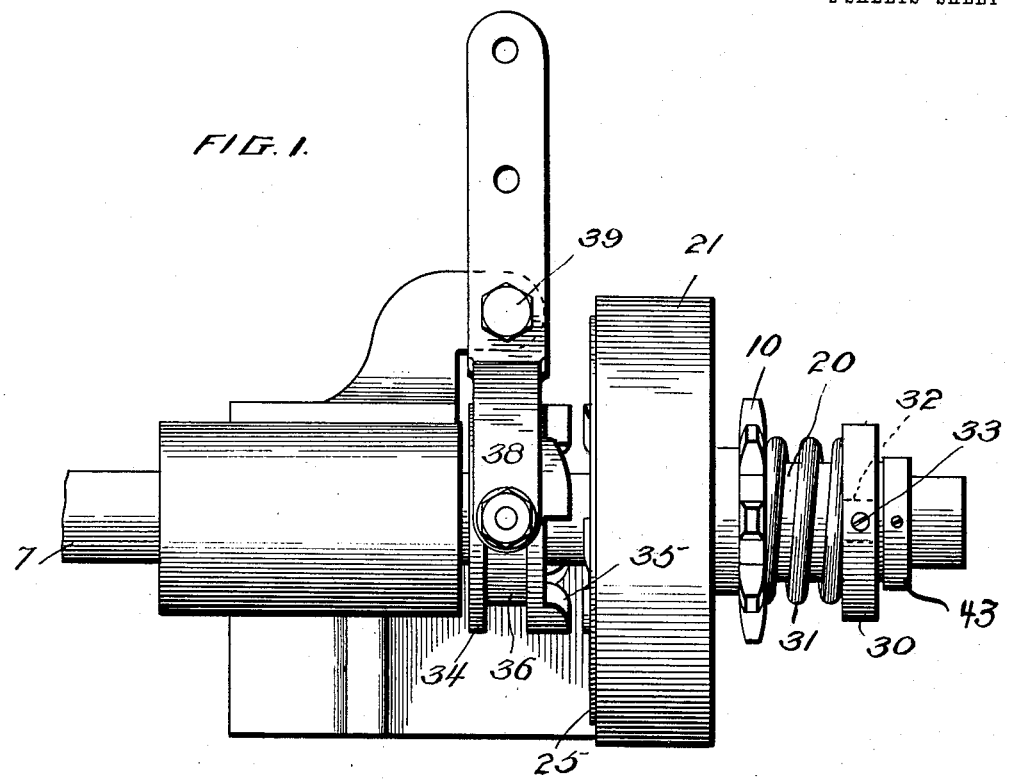
Figure 2:
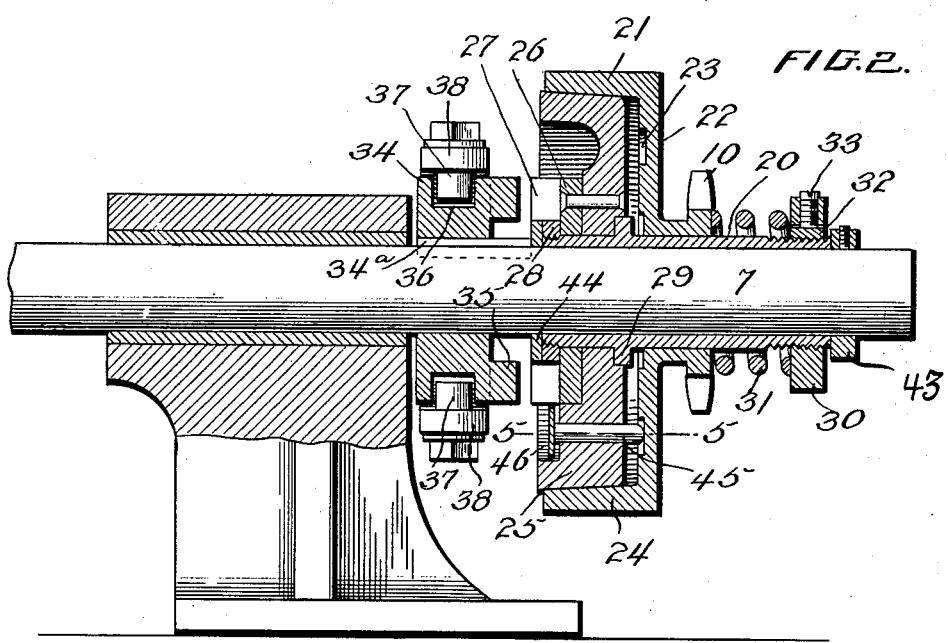

Referring to the drawings, Figure 1 represents a top plan view of an embodiment of my invention which I have selected for purposes of illustrating the invention. Fig. 2 is a vertical longitudinal sectional view of the apparatus shown in Fig. 1. Fig. 3 is a perspective view of the male friction clutch member having one of the positive clutch members connected therewith. Fig. 4 is a perspective view of the female friction clutch member. Fig. 5 is a partial sectional view on line 5—5 of Fig. 2, drawn to an enlarged scale.

The object of my invention is to provide clutch mechanism for transmitting motion from a moving part to a part to be operated thereby which shall be positive in its character and yet combine with it means for permitting the driven part to be stopped without breaking or straining of the parts, and to combine therewith means for notifying the operator that the driven part has stopped; and further to provide a device of this character which can be accurately adjusted to produce the desired result and which will not be thereafter affected in its operation by throwing the clutch mechanism into and out of operation; and further to provide an apparatus of this character which is self-contained and may be easily applied bodily to any shaft of the desired diameter.

In the embodiment of the invention herein selected for purposes of illustration, 7 represents a shaft which is designed to drive another rotary part, and which I will term for convenience the driving shaft, the said shaft being driven in any suitable manner. For example it may be coupled directly to a prime motor or it may itself be driven therefrom by any suitable form of gearing. The shaft 7 is shown as mounted in a bearing 1.

The driving shaft 7 is provided with a loose sleeve 20, preferably made of brass and upon this sleeve is loosely mounted one member of a friction clutch, in this instance the female member of a cone clutch, indicated at 21, which is shown detached in Fig. 4. The clutch member 21 comprises a disk portion 22, provided with an annular series of shallow ratchet teeth, or serrations 23 and a friction rim or flange 24 having its interior coned and forming a friction surface. The clutch member 21 is secured to (or has formed integrally with it) the driven part, in this instance the driving sprocket 10 from which power may be transmitted to any desired mechanism, and is capable of slight movement longitudinally of the shaft. 25 represents the other member of the friction clutch, which is rigidly attached to the sleeve 20 and consists of a casting having a conical peripheral friction face to fit within the clutch member 21. I also secure rigidly to the sleeve 20 one member of a positive clutch shown at 26, provided with teeth or projections 27. In this instance the clutch member 26 is riveted to the cone 25, and the two clutch members 25 and 26 are rigidly secured to the sleeve by means of a nut 28 screwed on a threaded portion at one end of the sleeve, and clamping the clutch members between it and an annular rib 29 with which the sleeve is provided. The other end of the sleeve is provided with an adjusting nut 30 on a threaded portion of the sleeve, and a spiral spring 31 is interposed between the adjusting nut and the sprocket 10 and clutch member 21. By adjusting the nut 20, the frictional resistance between the clutch members 21 and 25 can be accurately adjusted, and the nut 30 is provided with locking means for securing it in adjusted position. In this instance the nut 30 is provided with a recess on its interior, in which is fitted a clamping plate 32 threaded on its inner side to conform with the threading of the nut, and this plate is clamped against the threaded portion of the sleeve 20 by set screw 33, when the desired adjustment of the spring has been secured.

34 represents the movable member of the positive clutch, mounted on the shaft 7 so as to turn therewith, but movable longitudinally thereof as by means of a key or feather 34ª, and provided with teeth or projections 35 to engage those of the clutch member 26 and with an annular groove 36 to receive studs 37 on a yoke 38, pivoted at 39 and having an arm 40 extending rearwardly for operating the same. The sleeve 20 is held from longitudinal movement on the shaft 7 by any preferred means, as for example the collars 43, 44, the latter of which is placed at the inner end of the sleeve between the two members of the positive clutch. It is to be noted that with the single exception of the clutch member 34, the apparatus is entirely supported upon the sleeve 20, and is therefore what might be termed "self contained" and the apparatus can be placed in position upon any shaft by placing the sleeve and clutch member 34 in proper relative position, and securing the collars 43 and 44 to the shaft (without preparing the shaft in any way to accommodate said parts. It will also be noted that the degree of frictional resistance between the friction faces of clutch members 21 and 25 is entirely regulated by the tension of the spring 31, and its adjusting nut 30, and cannot be increased or affected in any way by the operator in throwing the positive clutch into and out of operation.

In order to provide means for calling the operator's attention to the fact that the friction clutch is slipping, for any reason as by the obstruction or clogging of the rotary driven part, I provide the friction clutch member 25 with a yielding projection, in line with the annular row of teeth or serrations 23 in the clutch member 21. In this instance I have shown the part 25 provided with a transverse aperture in line with said teeth 23, in which is located a loose pin 45, the outer end of which is engaged by a spring plate 46 (see Figs. 3 and 5) secured in place by a screw 47, which is conveniently provided with a locking washer 48 to prevent it from unscrewing, a split spring washer being suitable for this purpose.

In the operation of the device the spring 31 will be adjusted to provide sufficient friction between clutch members 21 and 25 to overcome any ordinary resistance of the rotary driven part, in normal operation. If the driven part or the mechanism connected therewith encounters any abnormal resistance, the resistance of the friction surfaces will be instantly overcome, and the driven part may remain stationary while the shaft 7 continues to revolve, and the pin 45 in passing over the teeth or serrations 23, will set up a noise which will at once notify the operator, who will proceed to stop the apparatus and remove the cause of the trouble. By this means the danger of breaking or injuring the driven part or the mechanism operated therefrom is entirely obviated.

As the members of the friction clutch are never given relative movement except in case of accident, there is practically no wear on the friction surfaces and the device is not likely to get out of order, or to require adjustment of any kind.

This application is a division of my application filed June 21, 1910, Serial No. 568,195 for improvements in motor lawn mowers.

What I claim and desire to secure by Letters Patent is:—

1. The combination with the driving shaft, of a sleeve loosely mounted thereon, a positive clutch comprising a member rigidly connected with said sleeve, and a member connected with the shaft to rotate therewith and capable of longitudinal movement thereon, a friction clutch carried by said sleeve comprising a member rigidly secured thereto and a member loosely mounted thereon, a spring surrounding said sleeve and engaging the loosely mounted friction clutch member, for holding said friction clutch members together with a predetermined pressure; a nut on said sleeve for adjusting the tension of the spring, a locking device for securing the nut in its adjusted position, devices adapted to be secured to the shaft for holding the sleeve against endwise movement thereon, and a driving wheel secured rigidly to the loosely mounted friction clutch member.

2. The combination with the driving shaft, of a sleeve loosely mounted thereon, devices for holding said sleeve from longitudinal movement, a friction clutch member loosely mounted on said sleeve, and provided with an annular series of serrations, a friction clutch member rigidly secured to the sleeve, a spring for holding said friction clutch members in engagement, an adjusting nut on said sleeve engaging one end of the spring, a driving wheel secured to rotate with the loosely mounted friction clutch member, a pin loosely mounted in the fixed friction clutch member, in position to engage the serrations of the opposing member, a spring engaging said pin, a positive clutch member secured to said sleeve and a positive clutch member mounted on the shaft to rotate therewith, but movable longitudinally thereof into and out of engagement with the opposing positive clutch member.

3. The combination with the driving shaft, of a sleeve loosely mounted thereon, devices for holding said sleeve from longitudinal movement, a positive clutch comprising a member keyed to the shaft and movable longitudinally thereon, and a member rigidly secured to said sleeve, said members having interlocking projections, a friction clutch carried by said sleeve, and comprising a friction cone rigidly secured to the sleeve, and a member loosely mounted on said sleeve and provided with a disk portion having an annular series of teeth, and a friction flange for engaging said cone, said friction cone being provided with an eccentric aperture parallel to its axis of rotation, in line with the series of teeth of the opposed clutch member, a pin loosely mounted in said aperture, a spring engaging said pin, a spiral spring surrounding said sleeve and holding said friction clutch members in engagement, an adjusting nut on said sleeve engaging one end of the said spiral spring, a locking device for said adjusting nut, and a driving wheel rigidly connected with the loosely mounted friction clutch member.

4. The combination with a driving shaft, of a friction cone clutch loosely mounted thereon, and comprising a fixed member, held against movement longitudinally of the shaft, and a member movable longitudinally of the shaft with respect to said fixed member, a driving wheel secured to the said movable member, a spring engaging the said movable member and holding it in contact with the fixed member with a predetermined pressure, a second clutch comprising a fixed member loose on the shaft but rigidly secured to the fixed member of the said friction clutch, and a movable member having a movement longitudinally of the shaft but secured thereto for joint rotation therewith.

5. The combination with a driving shaft having a plain cylindrical surface, of a sleeve loosely mounted on the shaft, means for holding the sleeve against endwise movement on the shaft, a friction cone clutch mounted on said sleeve, having a fixed member secured to rotate with the sleeve, and a member loosely mounted on said sleeve, and movable longitudinally thereof, a driving wheel loose on said sleeve but secured to said loose member of the friction clutch, a spring surrounding said sleeve, and engaging said loose member of the friction clutch for holding the said clutch members together with a predetermined pressure, a second clutch comprising a fixed member secured to rotate with said sleeve, and a movable member secured to said shaft to rotate therewith but movable longitudinally of the shaft.

6. The combination with a driving shaft having a plain cylindrical surface, of a sleeve loosely mounted thereon, means secured to the shaft for preventing the longitudinal movement of said sleeve, a friction cone clutch comprising a fixed clutch member rigidly secured to the said sleeve, a movable clutch member loose on the sleeve and capable of movement longitudinally of the sleeve, a spring encircling said sleeve, between said movable clutch member, and a part connected with the sleeve, a driving wheel rigidly connected with the said movable clutch member, a positive clutch comprising a fixed member carried by and rigidly connected with the said sleeve, and a movable member secured to rotate with the shaft but movable longitudinally thereon, and operating devices for throwing the movable member of the positive clutch into and out of engagement with the fixed member of said positive clutch.

In testimony whereof I affix my signature, in the presence of two witnesses.

WILLIAM H. COLDWELL.

Witnesses:
JOSEPH COLDWELL,
A. J. BRAZEL.